United States Patent [19]
Bytheway

[11] Patent Number: 5,669,595
[45] Date of Patent: Sep. 23, 1997

[54] WATER TAP FOR BASINS, BATHS, AND THE LIKE

[76] Inventor: Quinn Jonathon Bytheway, "Fair View", Shut End, Kingswinford, West Midlands DY6 7LR, Great Britain

[21] Appl. No.: 523,940

[22] Filed: Sep. 6, 1995

[30] Foreign Application Priority Data

Sep. 7, 1994 [GB] United Kingdom .................. 9418027
Feb. 16, 1995 [GB] United Kingdom .................. 9503045

[51] Int. Cl.⁶ .................................................. F16L 37/28
[52] U.S. Cl. ................................. 251/149.8; 137/322
[58] Field of Search .......................... 251/149.8, 149.1; 137/317, 319, 320, 321, 322, 323

[56] References Cited

U.S. PATENT DOCUMENTS

| | | | |
|---|---|---|---|
| 496,301 | 4/1893 | Farrington | 137/323 X |
| 1,336,123 | 4/1920 | Barnes | 251/149.8 |
| 5,404,901 | 4/1995 | Pickrell et al. | 137/322 X |

*Primary Examiner*—Kevin Lee
*Attorney, Agent, or Firm*—R. Steven Linne

[57] ABSTRACT

A tap assembly, method of installing it and a method of replacing it are provided in which the tap assembly comprises a tap body and a connector, the connector being connectable to a fluid supply pipe and being releasably connectable to the tap body, the tap body to the connector connection being effected by inserting at least a portion of one of the tap body or the connector into the other and subsequently twisting the tap body and/or the connector relative to one another. The assembly is easier to instal and replace offering increased versatility and reduced costs.

5 Claims, 7 Drawing Sheets

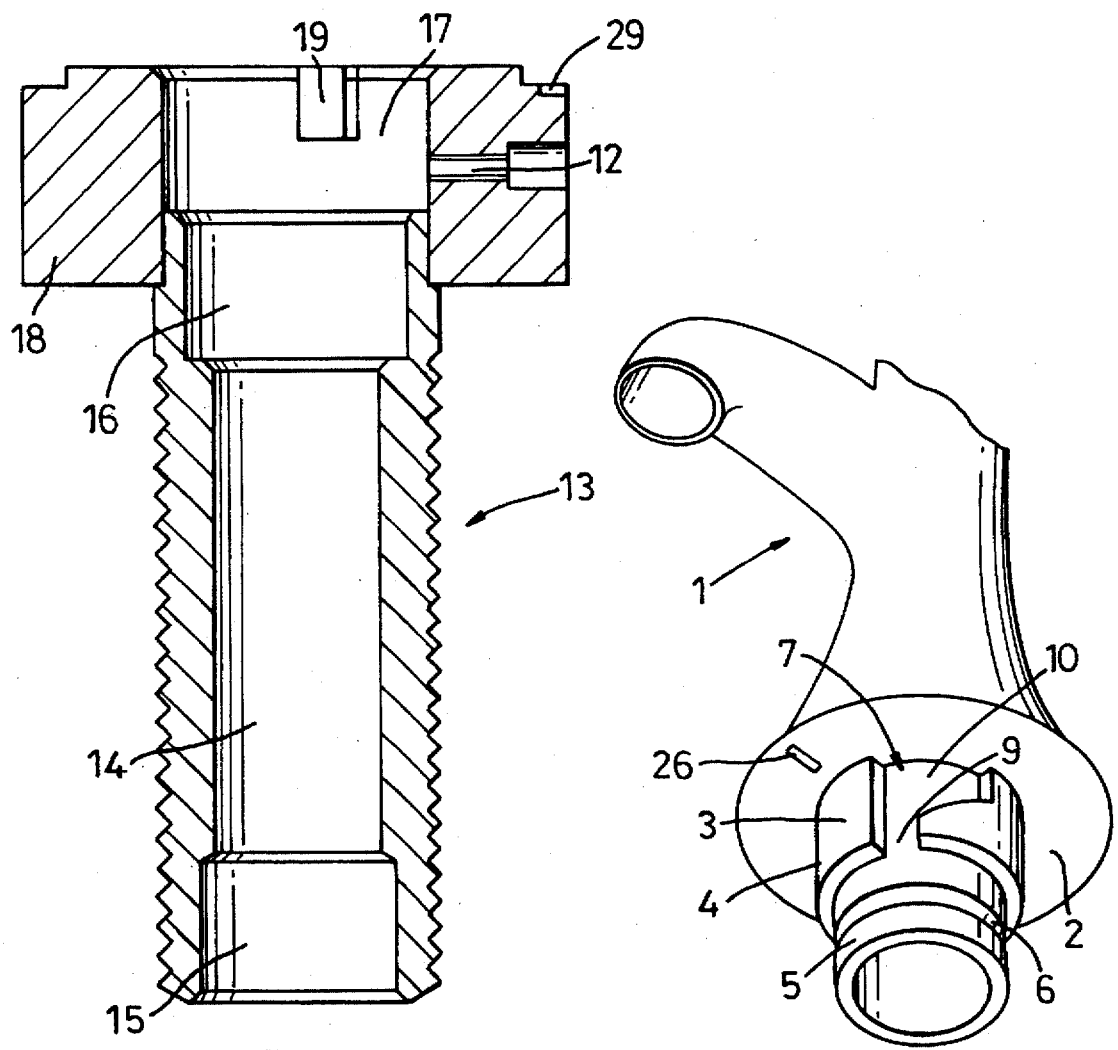
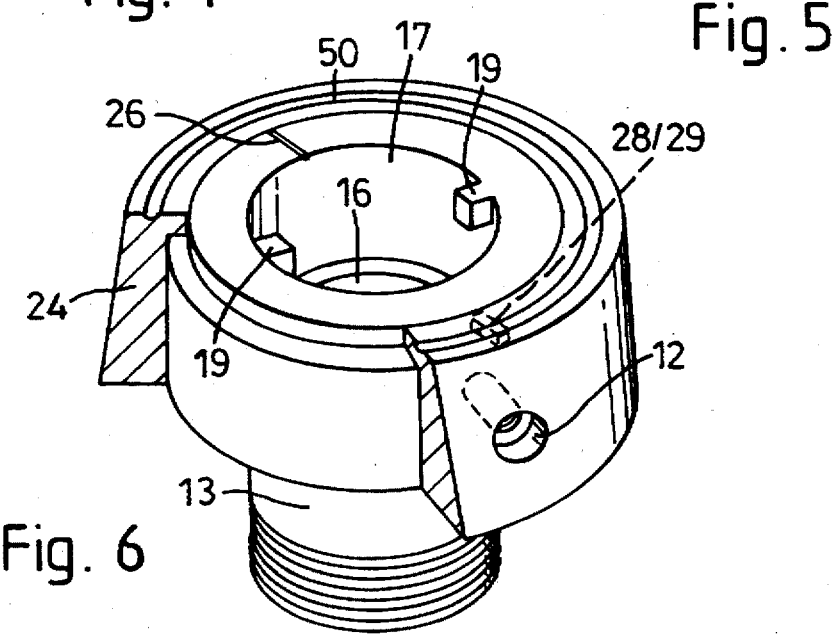

WATER TAP FOR BASINS, BATHS, AND THE LIKE

This Invention is concerned with improvements in relating to taps, particularly, but not exclusively of the type used on articles such as baths, basins or the like.

Conventional taps are fixed to baths etc., by providing a threaded stem on the tap which passes through an aperture in the surface of the article and is connected to the supply pipe. A back nut provided on the stem below the aperture in the article is tightened to sandwich the periphery of the aperture in the article between the back nut and a flange on the tap.

The connection, disconnection and re-connection of taps of this type involves a number of problems. Firstly on each occasion access is required both to the tap itself and to the underneath of the article. Access to the underneath may require the removal of panelling and can generally be awkward. Furthermore, as the connection between the tap and the supply pipe itself is disrupted the supply must not only be interrupted, but partially drained as well. In addition, as the whole unit is disturbed attention must be paid to the various seals, such as those between the supply pipe and the tap stem and between the tap and the article. This can frequently involve cleaning of the article to remove the existing sealant and consequently consumes time.

According to a first aspect of the invention we provide a tap assembly comprising a tap body and a connector, the connector being connectable to a fluid supply pipe and being releasably connectable to the tap body, the tap body to connector connection being effected by inserting at least a portion of one of the tap body or connector into the other and subsequently twisting the tap body or connector relative to one another.

In this way a quick and effective connection of a tap is effected without altering the supply pipe contact after initial assembly.

Preferably a portion of the tap body is inserted into the connector, most preferably a stem portion protruding from the base of the tap body. In this way easy location of the relative parts and continuation of the supply conduit can be effected.

A portion of the tap body may cooperate with valve means located within the connector, the twisting of the tap body or connector relative to the other causing the valve means to open when the tap body is connected to the connector.

In this way when a tap body is fitted a simple way for reconnecting supply to the tap is provided which coincides with the fitting.

Most preferably the valve means close when the tap body is released from the connector so as to isolate the supply as easily. Such a mode of operation is particularly suited to the barrel type and/or disc type assemblies of mixer taps, although it can be employed in other designs.

Preferably retaining means are provided to aid in retaining the valve means in the connector.

The connector may be of brass, plastics or other materials as desired and may be produced as a single casting or moulded unit so avoiding unnecessary joints.

Preferably the connector is adapted to project through an aperture in the article to the side on which the tap body is to be mounted, once more easing assembly. Most preferably the stem has an enlarged head portion and a reduced diameter stem, the stem projecting through the aperture in the article from the tap body receiving side. A back nut or other fastening means can be provided to clamp the article between the enlarged head portion and back nut, so providing a secure mounting for the connector which need not be altered after initial installation. This avoids the need to nave access to the underside of the article.

The tap body may be provided with one or more notches of substantially inverted L-shape to cooperate with lugs provided on the connector or vice versa. This provides a simple easily fixed connection system of the bayonet type.

Releasable fastening means may be provided so as to lock the tap body and connector relative to one another after connection. This prevents undesirable release of the tap body from the connector during use. The fastening means may be in the form of a grub screw or may be of a bar or pin passed through the assembly, for instance the control rod of a "pop-up" waste lever system.

The enlarged head portion of the connector may be a detachable ring, which may be attached to the connector by a screw-thread. Such an arrangement renders the connector more adjustable during assembly with respect to the article. An outer ring corresponding in appearance to the tap body may be mountable on the outside of the enlarged head portion to give improved cosmetic appearance.

According to a second aspect of the invention we provide a method for installing a tap assembly on an article comprising:

a) attaching a supply pipe to the connector b) fixing a connector relative to the article c) twisting the tap body relative to the connector to fix it in position.

Such a method of installation is easier and cheaper to perform than the conventional technique. The twist referred to is preferably about an axis passing through the tap body and connector, most preferably substantially perpendicular to the surface of the article to which the assembly is to be mounted.

Preferably the twist applied to the tap body turns it through less than 180° and most preferably through <90° to fix the tap body relative to the connector. Thus a limited turning action takes the unit from the released to clamped state and vice versa.

The tap bony and connector may subsequently be fixed relative to one another in a rotational sense by means of a releasable fastening such as a grub screw. This prevents inadvertent rotation during use.

According to a third aspect of the invention we provide a method for replacing a tap body in a tap assembly comprising:

a) twisting the tap body relative to the connector b) pulling the tap body away relative to the connector c) pushing the replacement tap body into position relative to the connector, and d) twisting the replacement tap body relative to the connector in the opposing direction to step a) to fix.

This is a far quicker and easier replacement method than is provided by the conventional technique where replacement of the whole unit is necessitated. This is particularly so where the degree of twist required is relatively low, say 180° or even 90° less.

The twisting action of step a) may also cause valve means provided in the connector to move from an open to closed state so preventing fluid flow from the connector. Alternatively, or in addition, step d) may cause valve means provided in the connector to move or return to an open state so allowing fluid flow through the connector into the tap body.

The apparatus thus offers a technique whereby two functions are achieved at once, the release or insert of the tap body and the closing or opening respectively of the valve controlling the supply source, further easing installation.

According to a fourth aspect of the invention we provide a tap body adapted to engage a connector by means of inserting at least a portion of one within the other with a subsequent twisting motion to fix.

According to a fifth aspect of the invention we provide a kit comprising a tap body according to the fourth aspect and an outer member for attachment to an exposed portion of the connector protecting from the article to which the assembly is to be attached.

The provision of kits in this way allows a standard connector to be employed with the tap body being replaced easily at will. This has particular advantages for the D.I.Y. market and for the likes of "new build" applications where a construction company is able to cheaply offer a very wide range of finishes for its bathrooms etc., with rapid installation.

The kit may also comprise a connector for use, for example, in the first installation of the assembly.

Embodiments of the invention will now be described, by way of example only, with reference to the accompanying drawings in which:

FIG. 4 is a cross-sectional side view of the connecting stem of the first embodiment;

FIG. 5 is a perspective view of a tap in accordance with the first embodiment;

FIG. 6 is a perspective view of connected stem head in accordance with the first embodiment;

FIGS. 1, 2 and 3 show varying views of a tap unit for use in the present invention. The tap is ostensibly the same as a conventional tap save for the nature of the fixing employed at its base.

Figure 1:
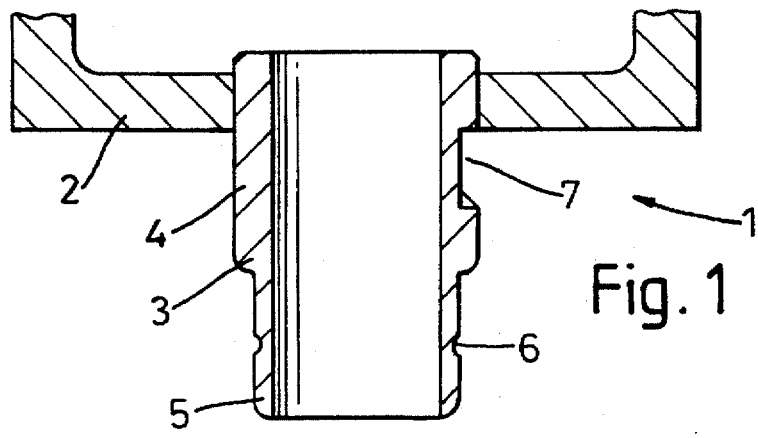
FIG. 1 is a cross-section through the base of a tap in accordance with a first embodiment.
Figure 2:
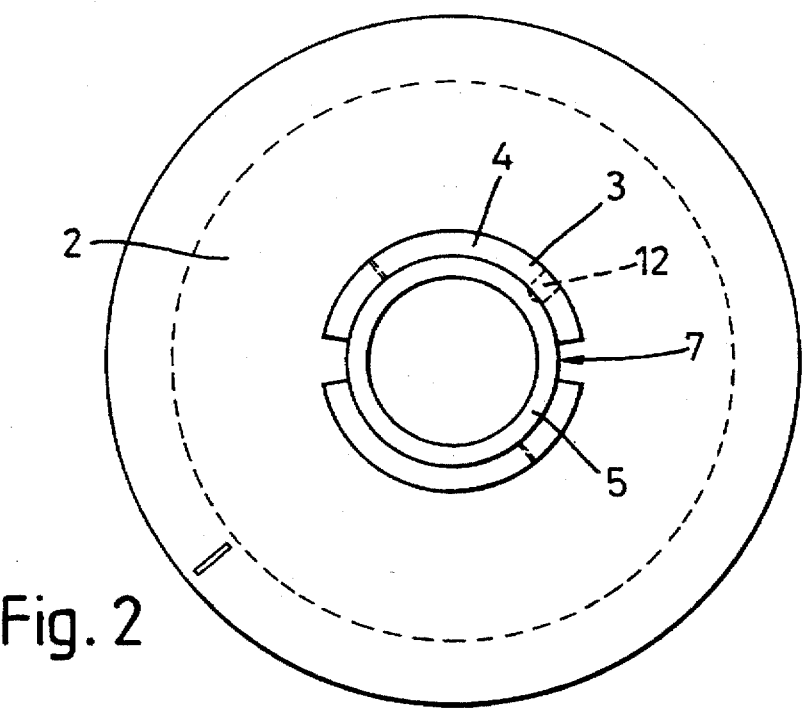
FIG. 2 is a plan view of the bottom of the base of the first embodiment.
Figure 3:
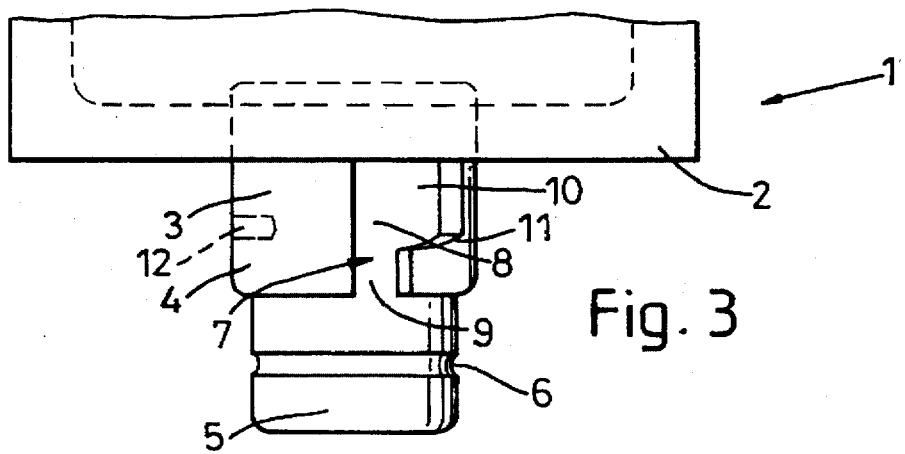
FIG. 3 is a side view of the tap box of the first embodiment showing the bayonet fixing.

As usual the tap body 1 has a base 2 provided with a stem portion 3 extending from the base 2. The stem 3 is hollow to allow the passage of the fluid to be controlled from its source into the tap. The onward flow of the fluid being controlled in conventional ways by a valve which can be opened to varying degrees.

The stem portion 3 of the tap 1 is provided with a wider external diameter first portion 4 and a narrower distal, second portion 5. A groove 6 is provided on portion 5 to accommodate an O-ring for sealing purposes.

The first portion 4 defines a notch 7 of a depth which renders its base 8 flush with the second portion 5. The notch 7 has a narrow neck portion 9 and a wider interior 10 with a curved transition surface 11 from the neck portion to the wider portion.

A second identical notch is provided on the opposing side of the stem.

A hole 12 is provided to accommodate a grub screw 27 for fixing the tap body 1 to the stem described below.

FIG. 4 shows the connecting stem 13 for connecting the water supply pipe (not shown) and the tap body 1. The connecting stem 13 has a hollow center 14 for carrying the fluid and is adapted to be connected to the supply pipe by a portion 15.

The mouth of the connecting stem 13 is provided with a first diameter opening 16 connected to the hollow interior and a second larger diameter opening 17 at its end defined by a collar 18. The collar 18 is soldered, brazed or otherwise attached to the end of the connecting stem 13. An integral collar 18 and stem 13 is also envisaged.

The opening 17 is provided with a pair of mutually opposed lugs 19 which are designed to cooperate with the notches 7 on the stem portion 3 of tap body 1.

The first diameter portion 16 is designed to snuggly accommodate the reduced diameter portion 5 of the stem portion 3 and to consequently compress the O-ring contained in groove 6 during insertion to provide a water-tight seal.

A hole 12, which continues into the tap body 1 is provided in the collar 18, to accommodate a grub screw 27.

Figure 7:
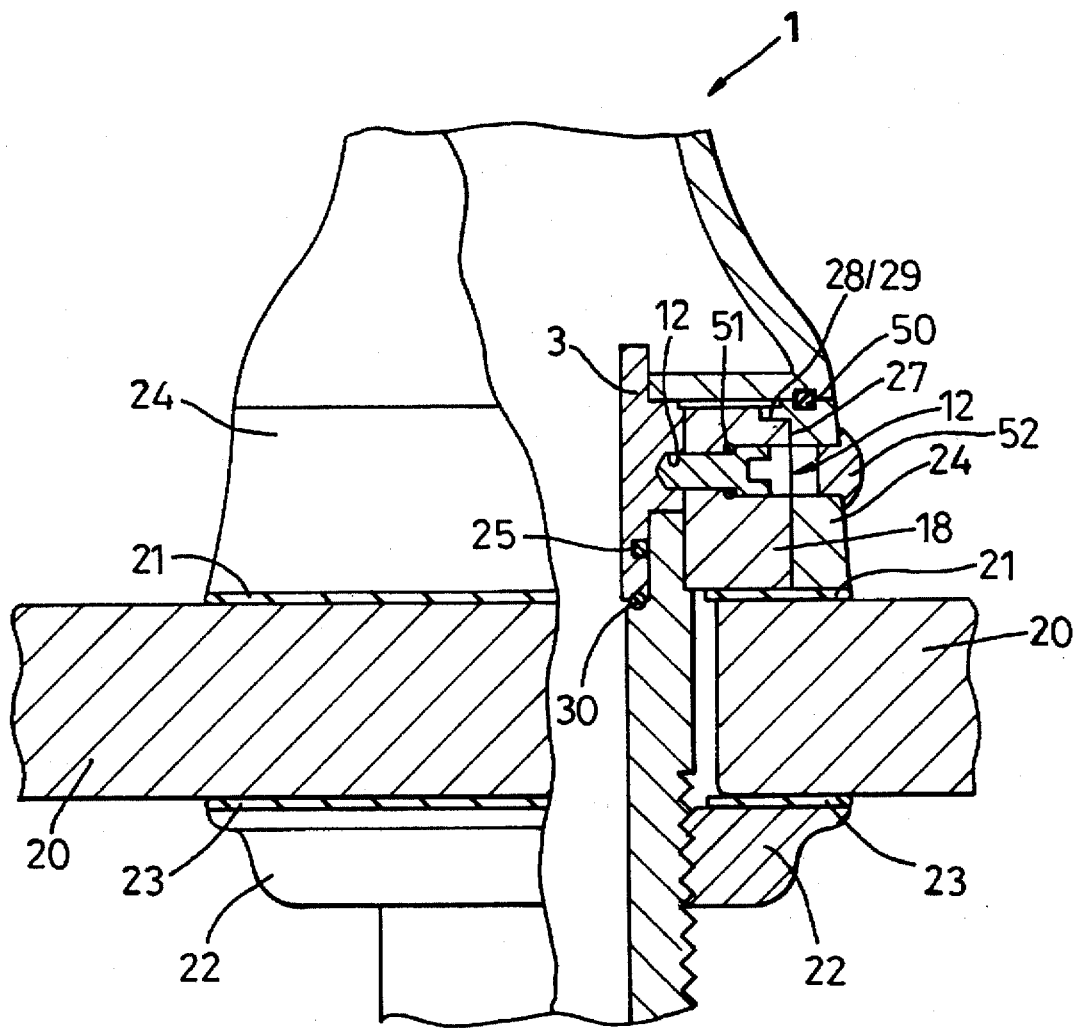
FIG. 7 is a partial cross-section through an assembled unit.
Figure 8:
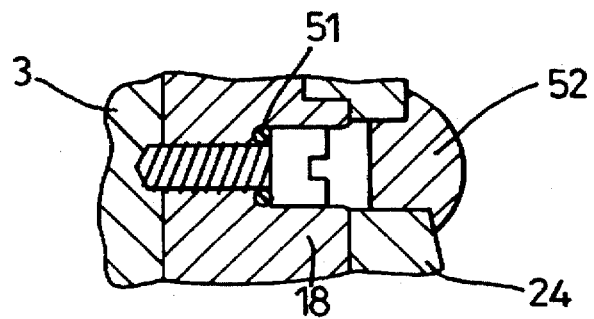
FIG. 8 is an enlarged view of the grub screw arrangement of FIG. 7.
Figure 9:
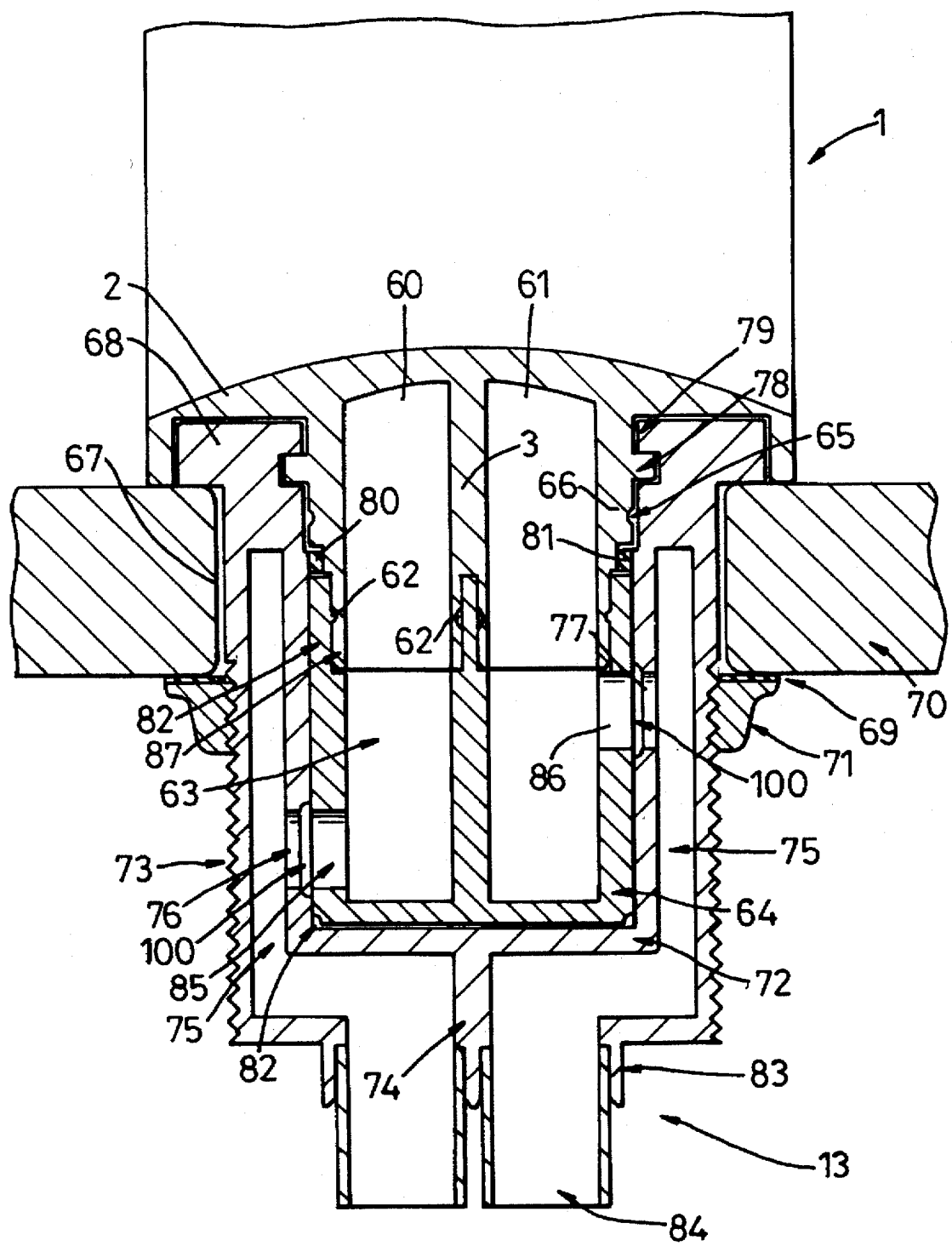
FIG. 9 shows a second embodiment of the invention by way of a cross-section.
Figure 10:
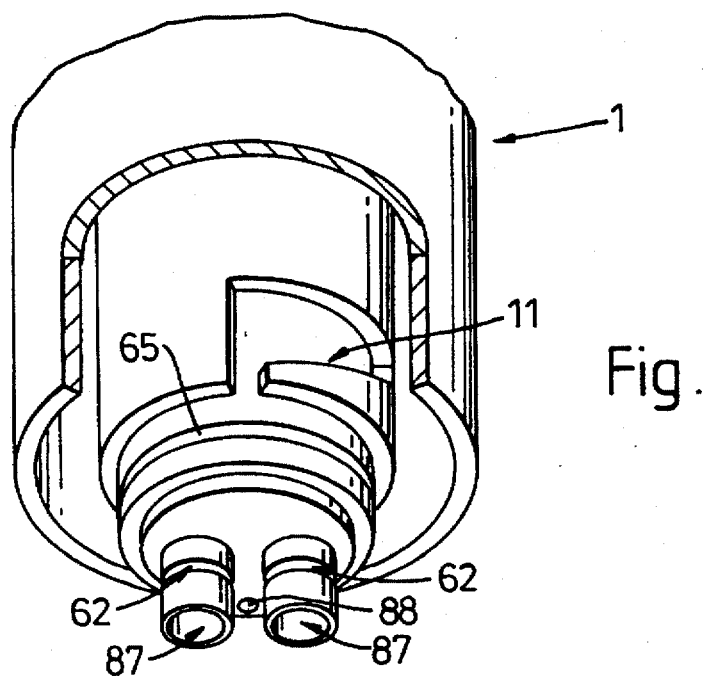
FIG. 10 shows a perspective view of the tap body of the second embodiment.

To connect the unit on the first occasion, to a state as illustrated in FIG. 7, it is necessary to insert the stem connector 13 so that it protrudes through the basin, bath or other article's rim 20 and attach a backing nut 22 and washer 23. Following this the supply pipe can be attached to the stem in the conventional way.

The collar 18 abuts a polystyrene washer 21, sandwiching it between collar 18 and basin 20. The back nut 22 can then be tightened to firstly clamp the unit to the basin etc., and sandwiching a further washer 23, this time of rubber.

To fix the tap unit 1 an outer ring 24 is placed over the outside of the collar 18. The external surfaces of the outer ring 24 match the tap unit to be fixed in terms of its style, colouring, finish and the like. The positioning of the outer ring 24 relative to the collar 18 is aided by a protrusion 28 on the ring 24 which is designed to cooperate with a notch 29 on the collar 18 so ensuring the grub screw aperture lines up. An O-ring 50 is provided in the top of the collar 24 to aid sealing.

The tap body 1 itself is then inserted by pushing the stem portion 3 down into the mouth of the collar 18 and tube 16. The tap is aligned relative to the connector stem 13 so that the openings of the notches correspond to the lugs 19, markings 26 may be provided on the components to aid in alignment. Pushing the tap down further locates the narrower stem portion within the tube and compresses the O-ring 25 to seal it, an additional O-ring 30 may be provided at the boundary between the stem 3, stem connector 13 and interior 16.

By rotating the tap unit relative to the collar 18 in the fully inserted position, the lugs 19 engage the portion 10 of the notch 7 that is enlarged.

In this position the notch and lugs 19 cooperate to resist any force applied along the axis of the unit.

To prevent accidental release of the tap during use a grub screw 27 is provided which locks the tap to the collar upon insertion. The grub screw passes through the outer ring 24 and collar 18, into the stem portion 3 of the tap body 9. A locating mark provided on the collar 18 and outer ring 24 aid in ensuring easy alignment of the two parts of the grub screw aperture. To aid in sealing the unit an O-ring 51 is provided under the head of the grub screw 27 and a plug 52 is provided to seal the aperture.

If it is desired to change the tap for any reason this is a far simpler task than for conventional taps. It is merely necessary to interrupt the water supply to the unit and remove the grub screw. A simple twist and pull motion applied to the unit will remove the tap.

If necessary the outer ring can also be unscrewed and replaced at this stage.

To fit the new tap it is simply necessary to push the tap in and twist it to engage, before inserting a grub screw.

The second embodiment is concerned with a type of fitting more commonly found in mixer taps where hot and cold water supplies are introduced to a single tap body 1.

The water inlets for hot and cold into the tap body 1 are provided in separate pipes 60,61 within the male protruding stems 3 with "O" ring seals 62 in grooves around outer circumference of stems 3. The stems 3 are perpendicular to the base 2 of tap body 1 and locate into the top part of female apertures 63 in a rotatable barrel valve 64. A further main "O" ring seal 65 is provided around the wider section 66 of the tap body 1.

The connector stem 13 is passed through an aperture 67 in the appliance 70. The stem top portion 68 is of a larger diameter than the aperture 67 in the appliance 70 thus preventing it from passing straight through. The outer circumference of the stem 13 is threaded allowing a rubber washer 69 and the appliance 70 to be sandwiched between the larger diameter top portion 68 and a back nut 71 which is screwed onto the outer thread enabling the connector stem 13 to be tightened to the appliance 70 in the usual manner.

The connector 13 is basically of the form of a cylinder 72 inside a larger cylinder 73. The smaller cylinder 72 being an integral part of the larger cylinder 73 by the inclusion of a dividing barrier 74, creating two separate chambers 75 to the main valve body 13. An aperture 76 is cut into the lefthand side (hot water) of the smaller inner cylinder 72 near to the bottom (but not flush with it). A similar aperture 77 is cut into the righthand side of the inner cylinder 72 the bottom of this aperture 77 being slightly more than half way from the bottom of the inner cylinder The larger diameter top portion 68 of the connector stem 13 houses the bayonet locating pegs 79 (or ramps 78 if reversed), and also creates an integral cap which seals the waterways 75 and dividing barrier 74 between the Inner 72 and outer 73 cylinders. The internal surface of the inner cylinder 72 immediately below the bayonet locating pegs 79 is machined to form a suitably smooth surface to create a watertight seal between it and the secondary "O" ring 65 around the wider section 66 of the tap body 1.

Immediately below this "O" ring 65 the internal diameter of the inner cylinder 72 of the connector stem 13 becomes slightly less than that of the "O" ring surface. A female thread 80 is cut into the top of this smaller diameter surface to accept a narrow male threaded retaining ring 81. The remainder of this smaller diameter surface from beneath the retaining ring thread 80 to the bottom of the inner cylindrical portion 72 of the main valve body 13 is also made suitably smooth to create a watertight seal with rings 82.

The circular base of the connector stem 13 has two integral cylindrical protruding inlet stems 83, one either side of the dividing barrier 74 with either a smooth internal surface capable of accepting soft copper tails 84 which may be soldered or brazed into them or female threads capable of accepting brass or plastic male threaded fittings which in turn can be connected to either copper or plastic 84 tails for carrying hot and cold water supplies into the valve body 13.

The valve is formed by an internal rotating barrel portion in the form of a cylinder 64 in the cylinder 72. Two holes 63 are provided by bores perpendicularly and parallel to each other from the top circular surface To the bottom of the cylinder 64 but which do not pass through the bottom of the cylinder 64. Two apertures 85,86 are machined into the outer circumference of the cylinder 64 to form one passageway from the outer side of the cylinder 64 into each of the bore holes 63. The outer diameter of the cylinder valve 64 is machined to be a sliding fit into the inner cylindrical portion 72 of the connector stem 13. When the cylinder valve 64 Is positioned into the inner valve body 72 the apertures 85,86 in the circumference of the cylinder valve 64 are the same size and shape as those 76,77 in the inner cylindrical portion 72 of the main valve body 13 and are positioned to align and create two separate passageways from the hot and cold inlet stems 84.

The outer circumference of the cylinder valve 64 has two "O" ring grooves 82, one near to the bottom below the lower aperture 85 and one above the upper aperture 86. These "O" rings create a seal between the cylinder valve 64 and the inner surface 72 of the main valve body 13 and also serve to keep the cylinder valve 64 firmly within the cylinder 72 thus allowing it to rotate smoothly.

Further seals 100 are provided around the outer periphery of apertures 76/77 in cylinder 72 to create a watertight seal between apertures 76 and 85 and 77 and 86 respectively. These seals 100 will prevent the passage of fluid from one bore hole 63 to the other when the rotating barrel 64 is in the open or closed position; thus maintaining the continuation of separate passageways for fluid throughout the connector stem 13 and into the male protruding stems 3 of the tap body 1.

Figure 11:
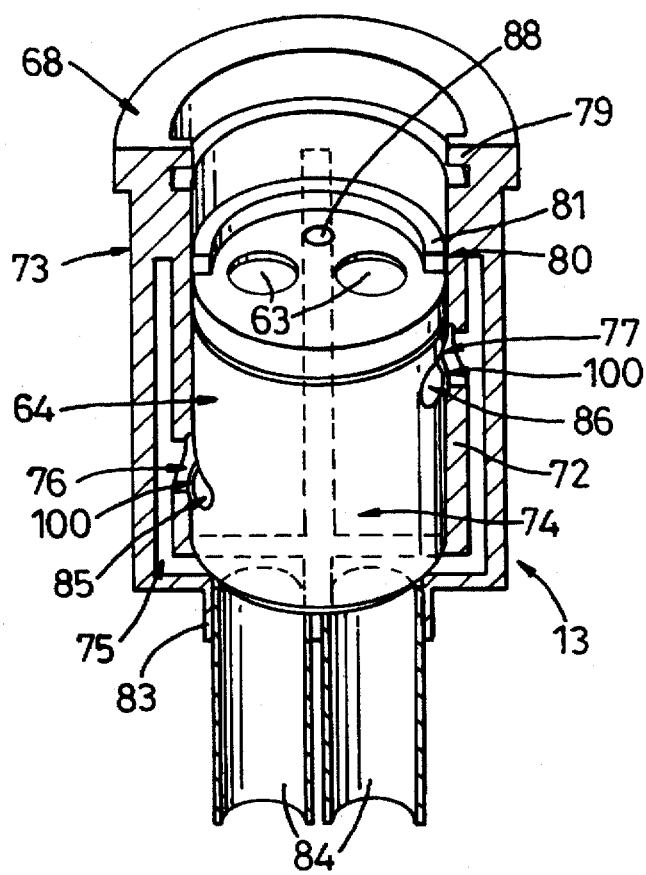
FIG. 11 shows a perspective view of the connector of the second embodiment.
Figure 11A:
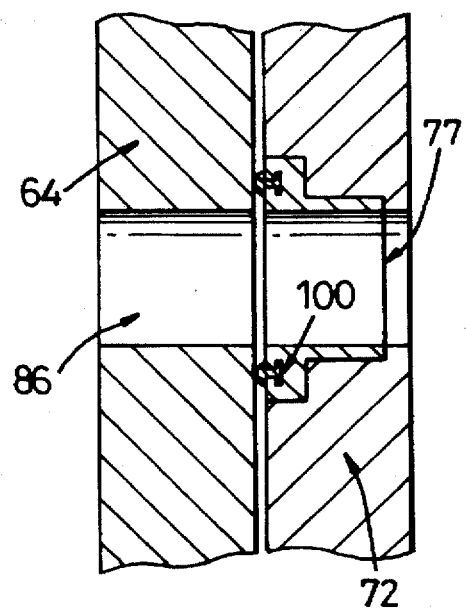
FIG. 11a shows a detail of FIG. 11.

The "O" rings 100 could be housed in plastic holders which are inserted into apertures 76 and 77 prior to rotating barrel 64 being fitted into the inner cylindrical portion 72 of the connector stem 13 as shown in FIG. 11a.

The inner surface of the cylinder valve bore holes 63 above the upper aperture 86 are machined to accept the tap body hot and cold water inlet stems 87 and create a watertight seal between the "O" rings 62 on the outside of the tap body water inlet stems 86 and the inner machined surfaces of the bore holes 63. This also creates a shoulder for possible compressible sealing points.

In this way the valve is also opened and shut by the twisting motion of the tap body 1 as this motion is transferred to the barrel 64. Twisting thus offsets and realigns the apertures 76,85 in the two components 72,64.

Some existing monobloc tap designs incorporate a push/pull rod which passes through the tap body 1 and connects to a mechanical pop-up waste lever system beneath the appliance. A similar device can be incorporated into the present invention by means of the push/pull rod passing through a hole 88 in the tap body 1 (off center), through the rotating barrel valve 64 and the connector stem 13 when they are all in alignment, that is with the tap body in the fully locked position within the connector stem 13 and the rotating barrel valve 64 is in the fully open position. Because the hole 88 for the rod is off-center to the connector stem 13 it is not possible to twist the tap body within its mount, thus preventing removal and obviating the need for a locking grub screw at the rear of the tap.

The holes 88 may be replaced by the locking grub-screw system in situations where a pop-up waste system is not employed.

When the cylinder valve 64 is pushed home into the inner valve body 72 the top circular surface of the cylinder valve 64 is slightly below the female threads 80 of the internal surface of the inner valve body A male threaded ring 81 is then tightened fully into the female internal valve body thread 80. The internal diameter of the retaining ring 81 is machined to allow a sliding fit for the outer surface of the smaller diameter section of the tap body 1 between the secondary "O" ring surface and the male tap body hot and cold water inlet stems. The retaining ring 81 thus prevents the removal of the cylinder valve 64 from the main valve body 13 but leaves it free to rotate within the inner valve body 72.

The main valve body/connector stem 13 assembly could be an integral part of a sanitary-ware appliance, (i.e. built into the tap hole of the bath/basin etc) thus ensuring that only a tap 1 compatible with this system could be installed into Such an appliance.

Figure 12:
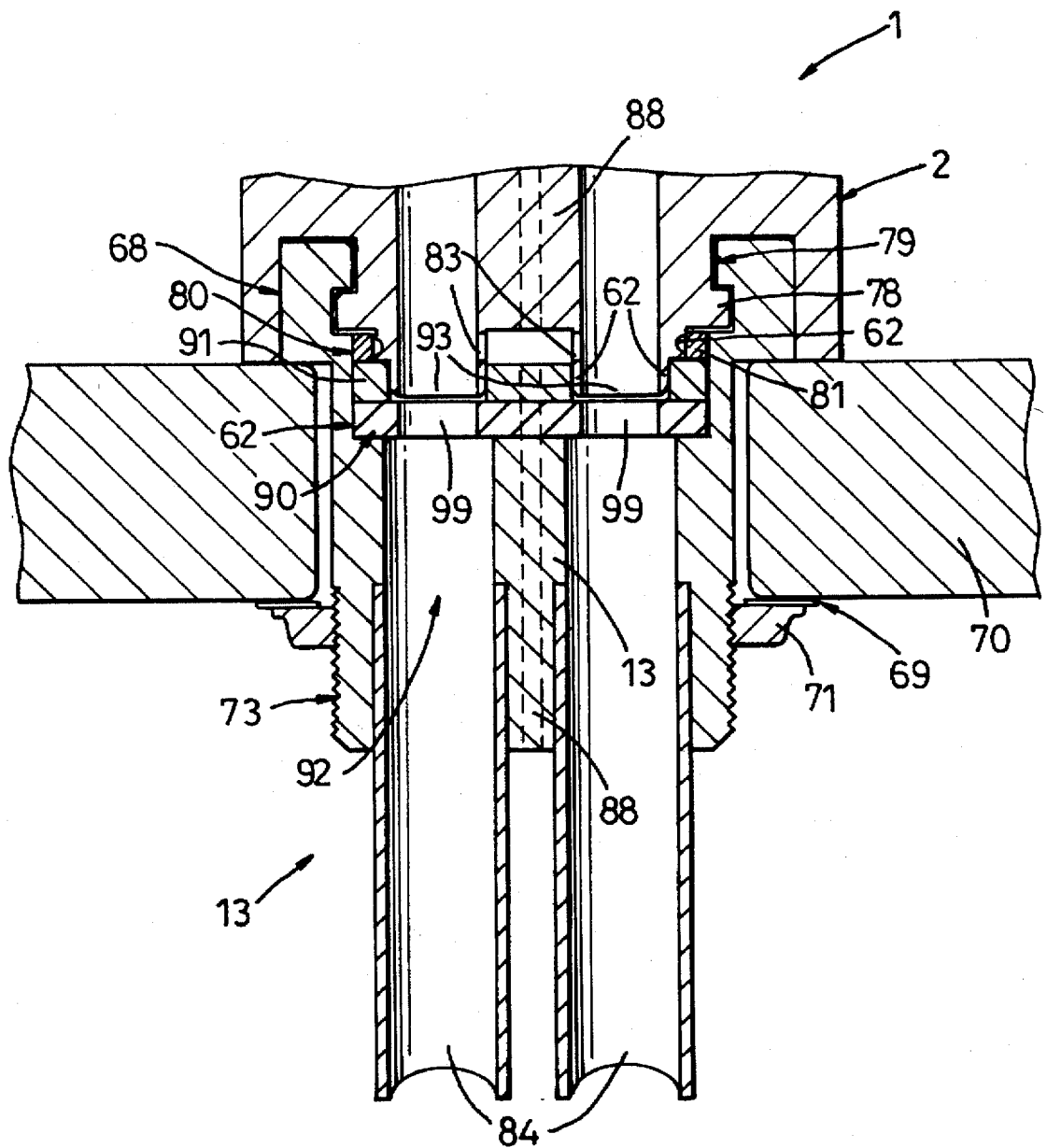
FIG. 12 shows a third embodiment by way of a cross-section through an assembled unit.
Figure 13:
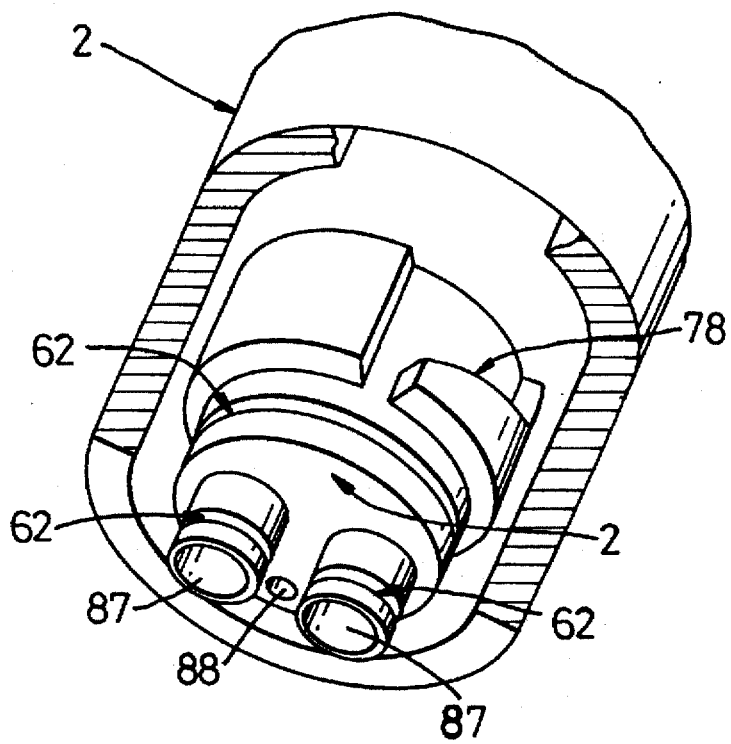
FIG. 13 shows a perspective view of the base of a tap body according to the third embodiment.
Figure 14:
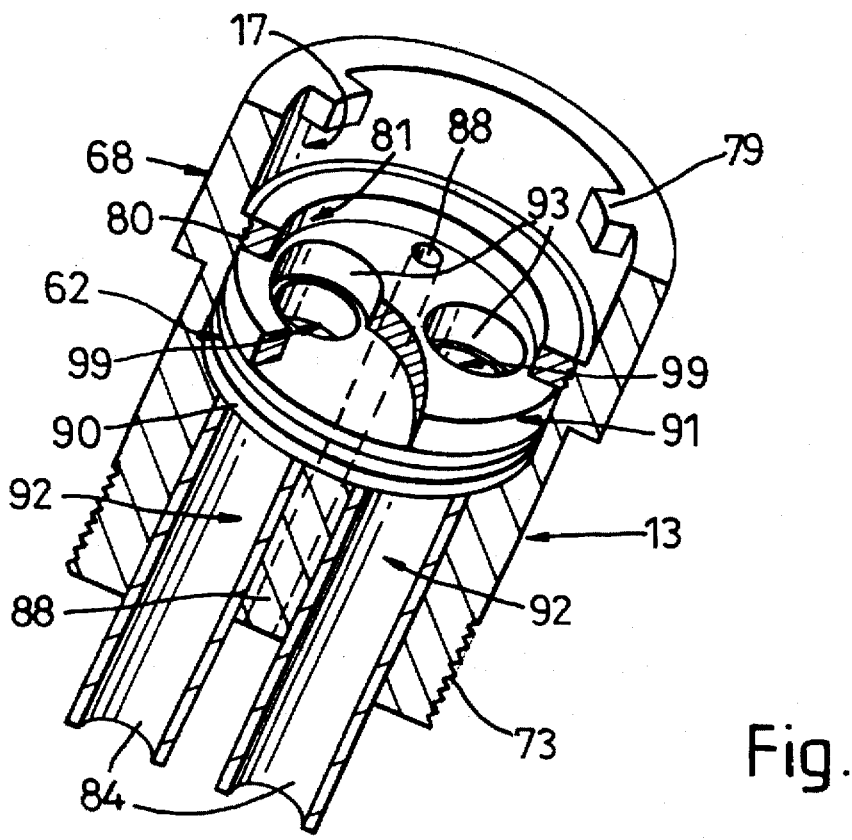
FIG. 14 shows a perspective view of the connector according to the third embodiment.

The third embodiment illustrated in FIGS. 12 to 14 shares many common features with the barrel type valve previously described. In particular the connection of the water supply to the connector 13 and the clamping of the connector 13 to the appliance 70 are effected in a very similar manner. Similarly the waste control rod can serve a dual purpose as the locking rod by means of apertures 88.

As an alternative to the control rod, the lower visible portion of the tap body 1 may be a separate outer ring located with a peg and notch to align the grub screw access holes, as in the first embodiment or it may be an integral part of the outer tap body 1, as shown in the drawings provided for this embodiment.

The primary difference in this embodiment is the valve type and the adjustment of the design to cooperate. As before the wider stem top portion 68 houses the bayonet locating pegs 79 (or ramps if reversed) as per the embodiments above. The area immediately below the locating pegs 79 allows passage of the bayonet ramps 78 during their rotating process when fitting the main tap body 1 to the connector stem 13.

Immediately below the bayonet ramp locating area, the internal diameter of the connector stem 13 becomes slightly smaller, the top portion of this smaller diameter section has a female thread 80 cut into it to accept the retaining ring 81, the surface immediately below the thread 80 is machined to form a suitably smooth surface to create a watertight seal between it and the "O" ring 62 around the outer circumference of the lower of a pair of discs 90. The disc 90 is fixed and is a ceramic disc, the distance between the bottom of the threads 80 and the inner circular surface of the base of the connector stem 13 allows the lower 90 and upper 91 ceramic discs to be positioned within this machined area following which the retaining ring 81 is fully tightened into the threads 80. When the ceramic discs 90,91 are in position with the retaining ring 81 tightened, the tolerances between these components are such that the ceramic discs 90,91 are not capable of any discernable vertical movement between the inner circular base of the connector stem 13 and the underside of the retaining ring 81. This creates a very close tolerance between the upper surface of the lower fixed ceramic discs 90 and the lower surface of the upper rotating ceramic disc However, these close tolerances are such that the upper ceramic disc 91 is just free to rotate through its 90° open/close motion, whilst maintaining a watertight seal between the upper surface of the lower ceramic disc 90 and lower surface of the upper ceramic disc 91 thus preventing passage of water from the hot apertures to the cold apertures in either the upper 91 or lower 90 ceramic discs.

The circular base of the connector stem 13 has two apertures 92 bored perpendicularly from the inner circular surface through and out of the circular outer base of the connector stem 13. The holes 92 are parallel to each other, one on the left (hot) and one on the right (cold), looking from the front of the connector stem 13 and positioned such that they align with the holes 99 in the lower fixed ceramic disc 90 and create two separate waterways through the connector stems 13 and ceramic disc valve assembly.

The water shut-off device comprises the lower fixed ceramic disc 90 and the upper rotating ceramic disc 91 which has two apertures 93 of a similar size and shape to those in the connector stem 13 and are positioned so that when aligned with the holes 99 in the lower disc 90 and holes in the connector stem, two separate clear passageways are created from the hot and cold copper tails 84, through the connector stem 13 to the tap body.

Thus to install the tap body 1 into the connector stem 13 the connector stem 13 complete with the ceramic discs 90,91 and retaining ring 81 must be installed into the appliance tap hole using the rubber washer 69 and backnut 70. The upper ceramic disc 91 must then be positioned so that it is in its fully closed position, (i.e. at 90° to its fully open position with the cold water inlet at the front and hot inlet at the rear, looking from the front of connector stem assembly 13), the tap body 1 is then held at 90° to its final fixed position with its outlet spout pointing to the right. The tap body hot and cold inlet stems 83 are then in alignment with the hot and cold apertures 93 in the upper ceramic disc 91; the tap body 1 is then pushed down into the upper ceramic disc 91, at the same time the bayonet locating pegs 79 pass through their slot openings and up into the widest portion of the bayonet ramps 78. The tap body 1 is then rotated clockwise through 90° until the locating pegs 79 reach the narrowest point of the bayonet ramps 78 and stop. The tap body outlet spout is now aligned with the index mark on the top surface of the wider portion of the connector stem 13 and is pointing in the desired direction for use. The upper ceramic disc 91 via the process of rotating the tap body 1, has been turned through 90° into the fully open position, thus creating two separate waterways from the copper/plastic tails 84, through the holes in the connector stem 13, through apertures 92,93 in the lower 90 and upper 91 ceramic discs and into the hot and cold inlet stems 87 which project from the circular base of the tap body 1. The tap body 1 can now be locked in position by either the grub screw or pop-up waste control rod methods.

Following development of the ceramic disc shut-off valve it may well be found that it would be preferential to mount the ceramic discs into a plastic holder which itself has "O" ring seals around its outer circumference creating a cartridge type component, (similar to existing ceramic disc cartridges as used in existing designs for controlling the flow of hot and cold water to a tap outlet).

I claim:

1. A sanitary-ware appliance comprising a mixer tap assembly operable in use to control the mixing and dispensing of water from separate hot and cold water supplies to the assembly, the assembly comprising a first part being a connector which is secured to the appliance and comprises separate inlets for receiving supplies of hot and cold water and a second part being a mixer tap comprising a body which is arranged for securement in the connector by insertion and rotation relative to the connector between a first orientation in which it is inserted and a second orientation in which it becomes secured and in which orientation separate hot and cold inlets of the tap body become connected through the connector to the hot and cold water inlets respectively of the connector, there being interengageable formations on the tap body and the connector whereby the tap body becomes secured in the connector upon being twisted between its first and second orientations, and the connector comprising shut-off means which becomes coupled to the tap body when said body is inserted into the connector whereby upon twisting the tap body between its second orientation and its first orientation, the supplies of hot and cold water through the connector become shut-off.

2. An appliance according to claim 1 is defining an aperture therethrough, said appliance having a tap body receiving side adapted to project through said aperture in said appliance to said opposing side, said connector having an enlarged head portion and a reduced diameter stem, said stem projecting through said aperture in said appliance from said tap body receiving side.

3. An appliance according to claim 2 in which a back nut or other fastening means is provided, said fastening means being provided to clamp said appliance between said enlarged head portion and said back nut, so providing a secure mounting for said connector which need not be altered after initial installation.

4. An appliance according to claim 1 in which said tap body is provided with one or more notches of substantially inverted L-shape, said notches cooperating with lugs, said lugs being provided on the connector or vice versa.

5. An appliance according to claim 1 in which releasable fastening means are provided so as to lock said tap body and said connector relative to one another after connection.

* * * * *